(12) United States Patent
Curl et al.

(10) Patent No.: US 11,084,343 B2
(45) Date of Patent: Aug. 10, 2021

(54) PIN BOX ASSEMBLY WITH GOOSENECK COUPLER

(71) Applicant: HORIZON GLOBAL AMERICAS INC., Plymouth, MI (US)

(72) Inventors: Michael R. Curl, Osceola, IN (US); Richard W. McCoy, Granger, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 154 days.

(21) Appl. No.: 15/936,549

(22) Filed: Mar. 27, 2018

(65) Prior Publication Data
US 2018/0215217 A1   Aug. 2, 2018

Related U.S. Application Data

(63) Continuation of application No. 13/392,283, filed as application No. PCT/US2011/052585 on Sep. 21, 2011, now Pat. No. 9,944,137.

(60) Provisional application No. 61/418,255, filed on Nov. 30, 2010, provisional application No. 61/384,767, filed on Sep. 21, 2010.

(51) Int. Cl.
*B60D 1/24* (2006.01)
*B60D 1/06* (2006.01)
*B60D 1/01* (2006.01)
*B62D 53/08* (2006.01)

(52) U.S. Cl.
CPC ............. *B60D 1/249* (2013.01); *B60D 1/015* (2013.01); *B60D 1/065* (2013.01); *B62D 53/0828* (2013.01); *B62D 53/0871* (2013.01)

(58) Field of Classification Search
CPC ........ B60D 1/249; B60D 1/065; B60D 1/015; B62D 53/0828; B62D 53/0871
USPC ........................................................ 280/439
See application file for complete search history.

(56) References Cited

U.S. PATENT DOCUMENTS

| | | | | |
|---|---|---|---|---|
| 2,594,592 A | * | 4/1952 | Rutter | A01B 59/042 280/489 |
| 2,635,892 A | * | 4/1953 | Shutter | B60D 1/34 280/489 |
| 3,918,744 A | * | 11/1975 | Gay | B62D 53/0857 280/418.1 |
| 4,168,847 A | * | 9/1979 | Westphal | B62D 53/061 280/423.1 |

(Continued)

OTHER PUBLICATIONS

International Searching Authority, US Office, International Search Report and the Written Opinion, PCT/US2011/052585, dated Feb. 8, 2012.

(Continued)

*Primary Examiner* — Jacob D Knutson
*Assistant Examiner* — Felicia L. Brittman
(74) *Attorney, Agent, or Firm* — McDonald Hopkins LLC

(57) ABSTRACT

A pin box assembly with gooseneck coupler for coupling a towed vehicle to a towing vehicle is described. The pin box assembly may include a first member capable of being secured to a towed vehicle and a second member pivotally coupled to the first member about an axis of rotation relative to the first member. The pin box assembly may further include a gooseneck ball coupler coupled to the second member, and a suspension system coupled to at least one of the first and second members, the suspension system damping motion between the first and second members.

21 Claims, 10 Drawing Sheets

(56) References Cited

U.S. PATENT DOCUMENTS

| | | | |
|---|---|---|---|
| 4,817,979 | A | 4/1989 | Goettker |
| 5,623,962 | A | 4/1997 | Danzy |
| 5,694,969 | A * | 12/1997 | DeVuyst ................. B60C 29/06 |
| | | | 137/226 |
| 5,785,341 | A * | 7/1998 | Fenton ............... B62D 53/0821 |
| | | | 267/35 |
| 6,481,738 | B1 | 11/2002 | Duncan |
| 7,097,193 | B1 * | 8/2006 | Sievert ................... B60D 1/065 |
| | | | 280/438.1 |
| 7,380,811 | B2 | 6/2008 | Rehme |
| 7,552,937 | B1 | 6/2009 | Taylor |
| 7,703,793 | B2 | 4/2010 | Kovach |
| 7,712,761 | B2 | 5/2010 | Mater |
| 8,205,905 | B2 | 6/2012 | Zilm |
| 2003/0178811 | A1 * | 9/2003 | Buckner .................. B60D 1/50 |
| | | | 280/483 |
| 2008/0296867 | A1 | 12/2008 | Bouwkamp |
| 2010/0140899 | A1 | 6/2010 | McCoy |

OTHER PUBLICATIONS http://www.myairhitch.com/, My Air Hitch, LLC., Ponder, TX, 2007.

* cited by examiner

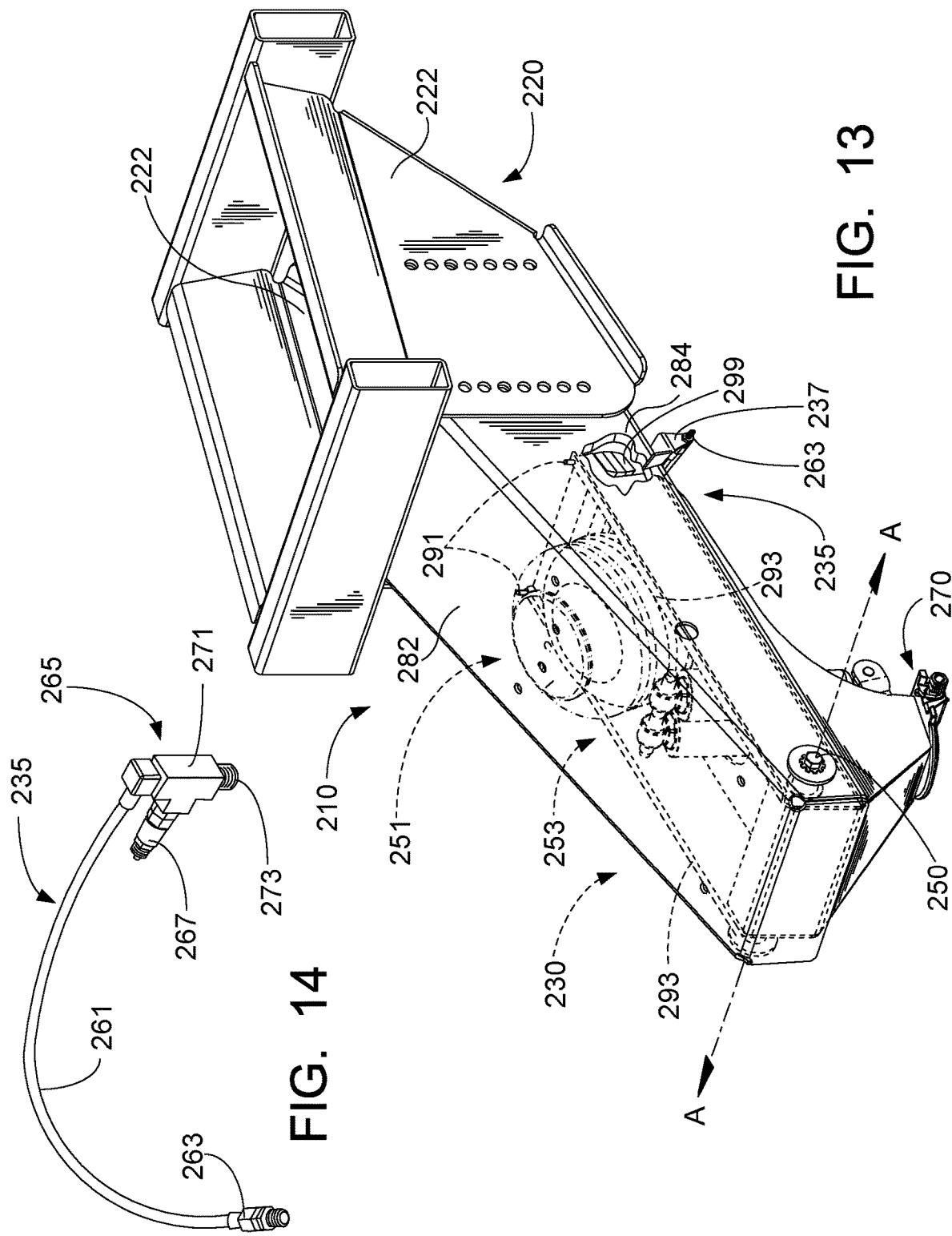

PIN BOX ASSEMBLY WITH GOOSENECK COUPLER

CROSS-REFERENCE TO RELATED APPLICATION

This application is a continuation of U.S. patent application Ser. No. 13/392,283, filed on Jun. 1, 2012, which is a National Stage Entry of International Patent Application No. PCT/US11/52585, which claims the benefit of U.S. Provisional Patent Application No. 61/384,767, entitled "Pin Box Assembly with Gooseneck Coupler," filed on Sep. 21, 2010, and U.S. Provisional Patent Application No. 61/418,255, entitled "Pin Box Assembly with Gooseneck Coupler," filed on Nov. 30, 2010, all of which are hereby incorporated in their entirety by reference.

FIELD OF THE INVENTION

The present invention is generally related to a towing assembly and, more particularly, to a pin box assembly with gooseneck coupler.

BACKGROUND

Many vehicles are designed to transport freight, goods, merchandise, personal property, and other such cargo. Often, such vehicles may be arranged to tow a trailer by attaching the trailer to the towing vehicle, such as through the use of a hitch assembly. The towing industry has developed a number of methods and apparatuses for securing or engaging the towed vehicle or trailer to the towing vehicle, such as a truck.

There are many different types of trailer hitches in the art that may be attached to the towing vehicle in a variety of ways, depending on the type of hitch. Some of the most common types of hitches include gooseneck, fifth wheel, rear mount, and the like. Typically, trailers may be connected to the towing vehicle by way of a hitch assembly including a ball hitch or member secured to the towing vehicle and a ball socket coupling mechanism on the towed vehicle or trailer that mounts over the ball and thereby allows for the trailer to pivot behind the towing vehicle.

Numerous types of hitch balls have been developed to be attached to the bumper or other rear portion of a towing vehicle. The trailer or towed vehicle may be equipped with a coupler mechanism to be attached to the towing vehicle by placing the coupler mechanism over the hitch ball and securing the coupler to the hitch ball. Similar apparatuses using hitch receivers attached to the rear of the towing vehicle and drawbars may be used to secure trailers to towing vehicles.

Some trailers may be designed to carry heavy loads. Connecting such a trailer to a ball hitch on a bumper of a towing vehicle, however, may be impractical. When a trailer load is heavy as compared to the weight of the towing vehicle, applying the trailer load over or in close proximity to the rear axle of the towing vehicle may create a more stable towing condition. In addition, such an arrangement may put much of the force of the trailer load onto structural members of the towing vehicle, such as the frame, whereby the hitch ball may be located in the truck bed.

There are generally two arrangements for securing a trailer to the bed of a towing vehicle—a fifth wheel hitch and a gooseneck ball. A gooseneck hitch may be utilized with a towed vehicle having a gooseneck coupler that may generally be coupled to a gooseneck ball that may be located in the bed of the towing vehicle. The gooseneck ball may typically be permanently secured to the frame or bed of the towing vehicle. A fifth wheel hitch is utilized with towed vehicles having a king pin, which may be part of a pin box attached to the towed vehicle. The fifth wheel hitch may generally be positioned in a bed of a truck and secured either to the bed or directly to the frame of the truck. Fifth wheel hitches may generally be attached to the bed or frame in a more permanent manner, whereby tools may generally be required to remove fasteners and other connectors to install or uninstall a fifth wheel hitch to the bed of a towing vehicle. In this towing system, the king pin may couple with the fifth wheel hitch.

The gooseneck coupler to gooseneck ball connection may allow for more relative movement between the towing vehicle and the towed vehicle as the towing vehicle makes turns, traverses uneven or rough terrain, and passes along inclining and declining roadways. The gooseneck ball member may be removed or lowered to a stowed position below the bed to ensure that the use of the bed is not substantially hindered by the presence of the gooseneck ball.

The gooseneck coupler typically may include a manually operated clamping arrangement that may retain the gooseneck ball member in the socket and thus the towed vehicle to the towing vehicle. Generally, the gooseneck coupler may be secured to the tongue of the towed vehicle, usually a forward extension of the frame. Due to ease of hookup, recreational vehicles or travel trailers (RV) may typically utilize a king pin and fifth wheel hitch to couple to a towing vehicle while relatively less expensive towed vehicles, such as a horse or livestock trailer, typically utilizes a gooseneck coupler. A consequence is that an owner or user of a variety of towed vehicles may have to have multiple towing vehicles (one with a fifth wheel hitch and one with a gooseneck hitch) or swap out the fifth wheel hitch and the gooseneck hitch when it is desired to tow a differently configured towed vehicle. The swapping of a fifth wheel hitch into and out of a towing vehicle, however, may be very cumbersome and time consuming and may not be readily available.

In an attempt to allow a typically fifth wheel hitch towed vehicle, such as an RV to be towed with a gooseneck hitch, the trailer industry has addressed this situation by utilizing a pin box adaptor or extension which is placed on the king pin box. The adaptor may permit the king pin box to be hooked up to or engaged with a gooseneck ball. These adaptors, however, typically cause additional stress on the king pin box, the mounting structure and ultimately on the towed vehicle itself. Additionally, the use of the adaptor can change the geometry of the connection between the towing vehicle and the towed vehicle such that an unwanted orientation of the towed vehicle may be realized. Therefore, there is a need for an improved system.

SUMMARY

A pin box assembly for coupling a towed vehicle to a towing vehicle is disclosed. The pin box assembly may include a first member capable of being secured to a towed vehicle and a second member pivotally coupled to the first member about an axis of rotation relative to the first member. The pin box assembly may further include a gooseneck ball coupler coupled to the second member, and a suspension system coupled to at least one of the first and second members, the suspension system damping motion between the first and second members.

In some embodiments, a pin box assembly for coupling a towed vehicle to a towing vehicle may include a first member configured to be attached to the towed vehicle in a fixed orientation and a second member movably coupled to the first member. The pin box assembly may further include a suspension system coupled to at least one of the first and second members, the suspension system including a biasing member and a damping member capable of restricting relative movement between the first and second members, and a gooseneck ball coupler attached to the second member and capable of moving upon movement of the second member, the gooseneck ball coupler configured to engage and disengage with a gooseneck ball on the towing vehicle.

In some embodiments, a pin box assembly may include a first box member capable of selectively attaching to a towed vehicle, a second box member pivotally secured to the first box member about an axis of rotation, and a gooseneck ball coupler coupled to the second box member. The pin box assembly may further include a biasing member coupled to the second box member, the biasing member restricting relative motion between the first and second box members, and a bump stop isolator attached to the second box member opposite the biasing member, the bump stop isolator restricting relative motion between the first and second box members in a direction generally opposite to that of the biasing member.

In some embodiments, a pin box assembly may include a first member configured to be attached to a towed vehicle in a fixed orientation, and a second member pivotally coupled to the first member. The pin box assembly may further include a suspension system coupled to at least one of the first and second members, the suspension system including a pneumatic member capable of restricting relative movement between the first and second members and wherein the pneumatic member adjusts automatically from being over-inflated, and a gooseneck ball coupler attached to the second member and capable of moving upon movement of the second member, the gooseneck ball coupler configured to engage and disengage with a gooseneck ball on the towing vehicle.

In some embodiments, a pin box assembly may include a first member configured to be attached to a towed vehicle in a fixed orientation, a second member movably coupled to the first member, and a suspension system coupled to at least one of the first and second members, the suspension system capable of restricting relative movement between the first and second members. The pin box assembly may further include an indicator secured to at least one of the first and second members wherein the indicator is capable of identifying occurrence of the suspension system failing to restrict relative movement between the first and second members, and a gooseneck ball coupler attached to the second member and capable of moving upon movement of the second member, the gooseneck ball coupler configured to engage and disengage with a gooseneck ball on a towing vehicle.

BRIEF DESCRIPTION OF THE DRAWINGS

Operation of the invention may be better understood by reference to the following detailed description taken in connection with the following illustrations, wherein:

FIG. 13 is a semi-transparent perspective view of an alternative embodiment of a pin box assembly with gooseneck coupler.

FIG. 14 is a perspective view of an air relief system of a pin box assembly with gooseneck coupler.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
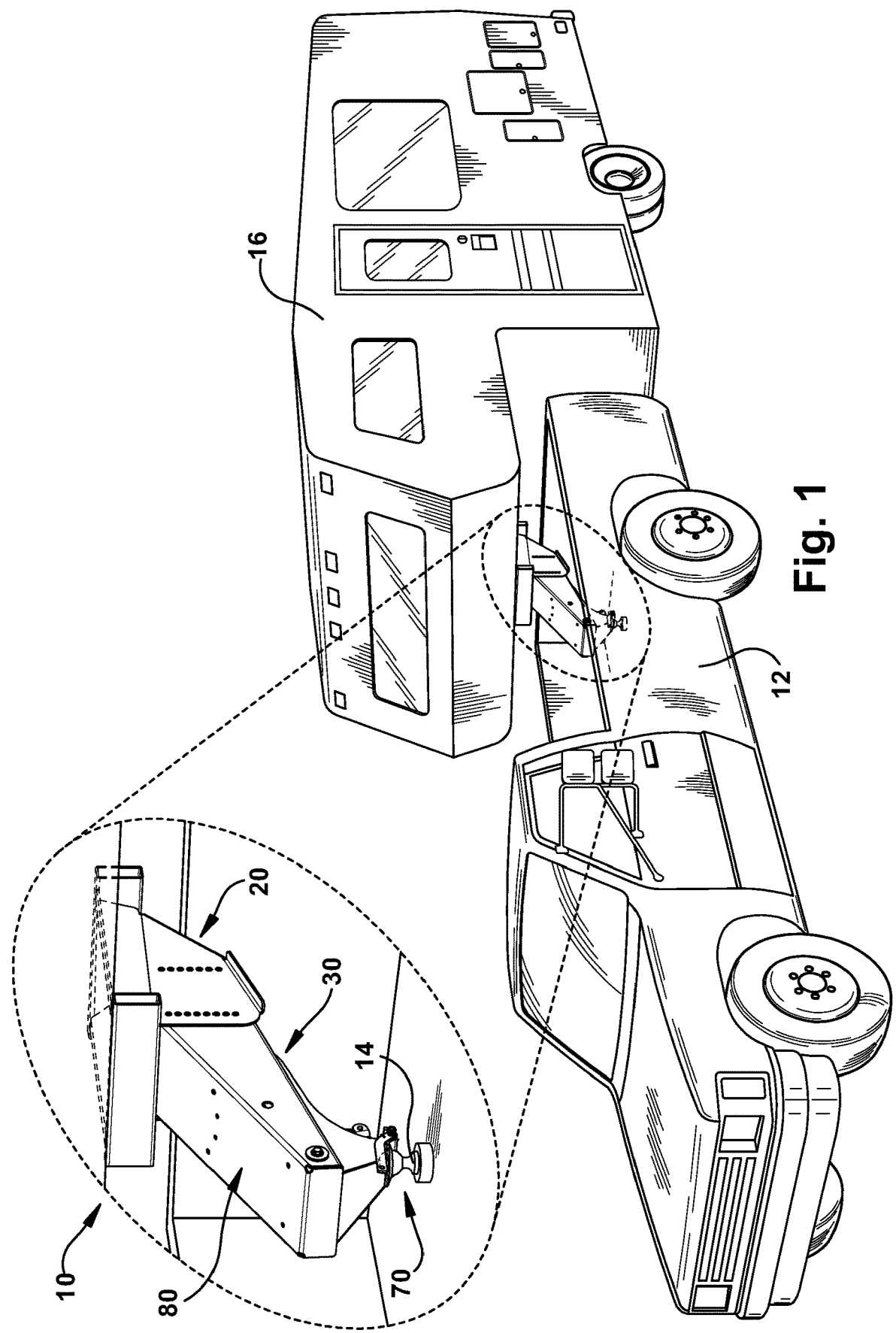
FIG. 1 is an environmental perspective view of an embodiment of a pin box assembly with gooseneck coupler in a non-limiting example according to the present teachings.
Figure 2:
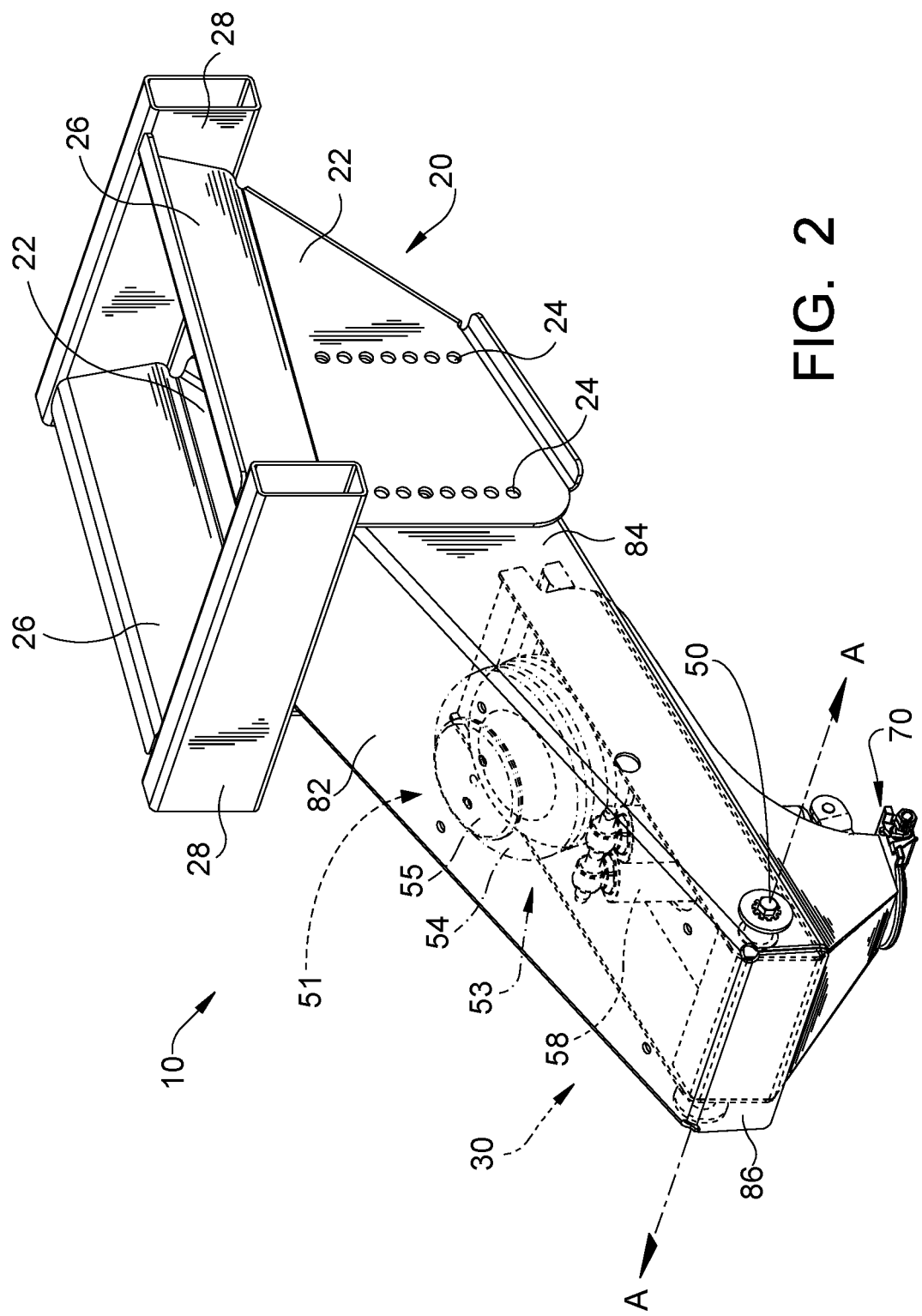
FIG. 2 is a semi-transparent perspective view of the pin box assembly with gooseneck coupler of FIG. 1.
Figure 3:
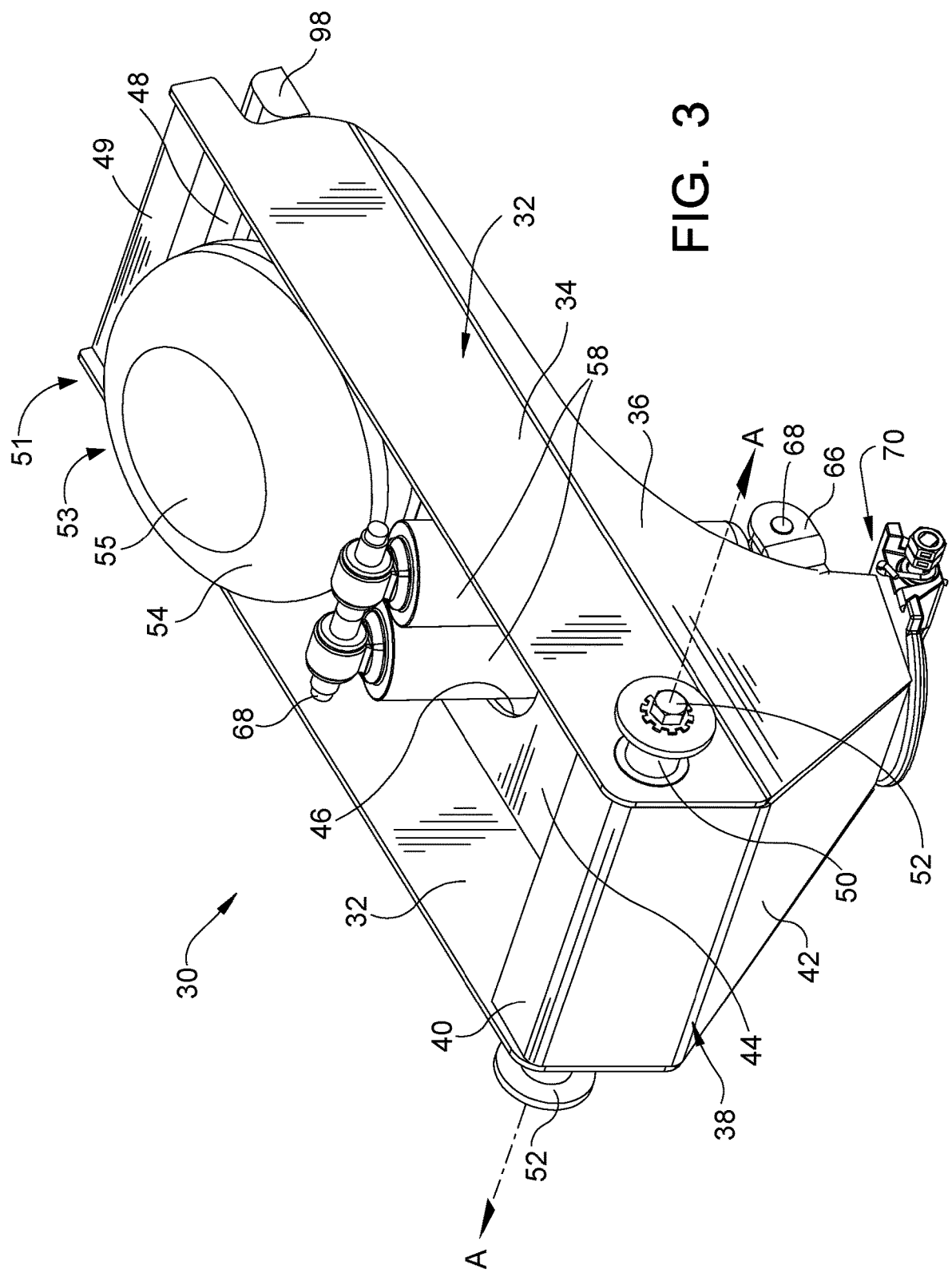
FIG. 3 is a perspective view of a lower jaw assembly of the pin box assembly with gooseneck coupler of FIG. 1 without a cover.
Figure 4:
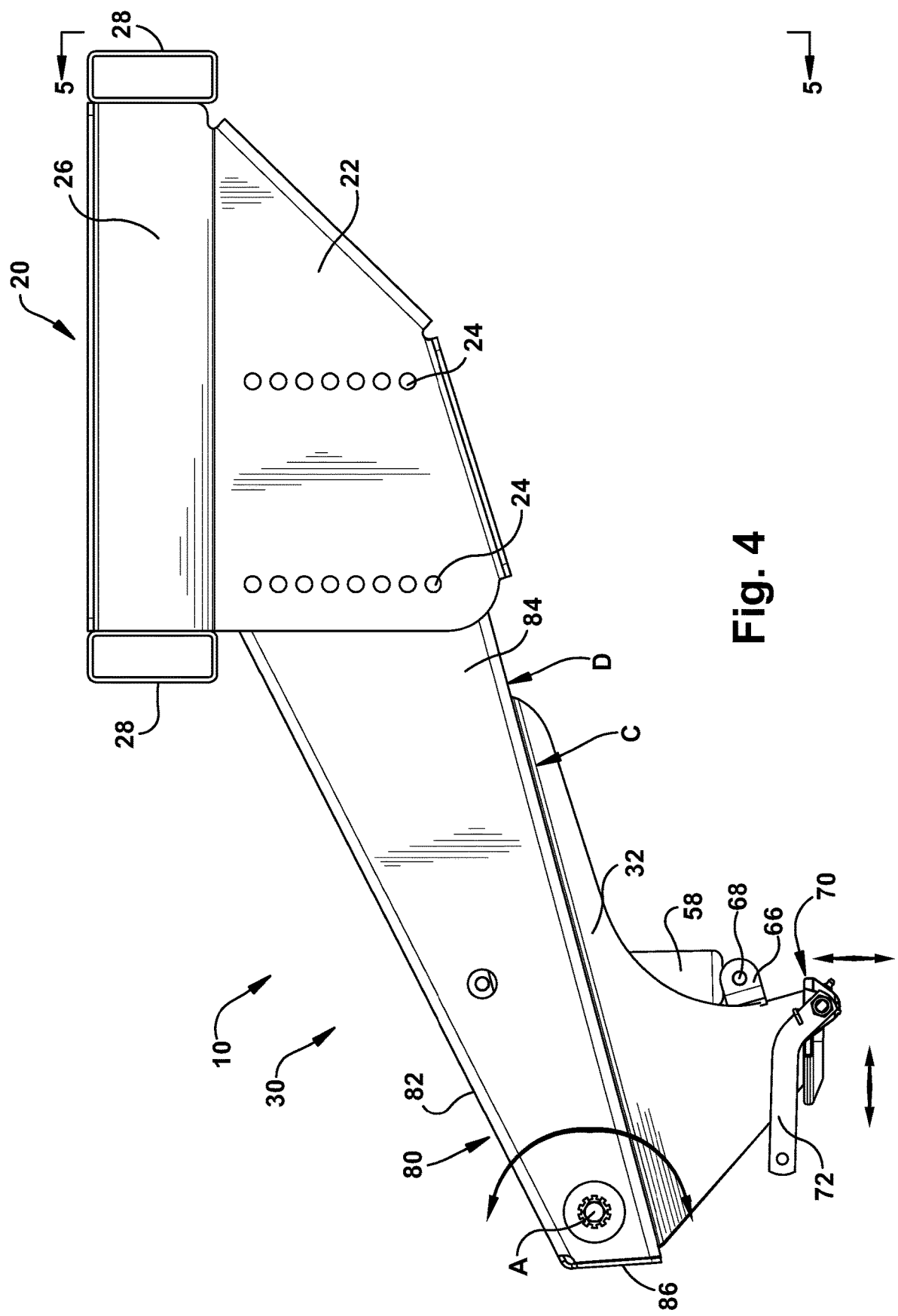
FIG. 4 is a plan view of the pin box assembly with gooseneck coupler of FIG. 1.
Figure 5:
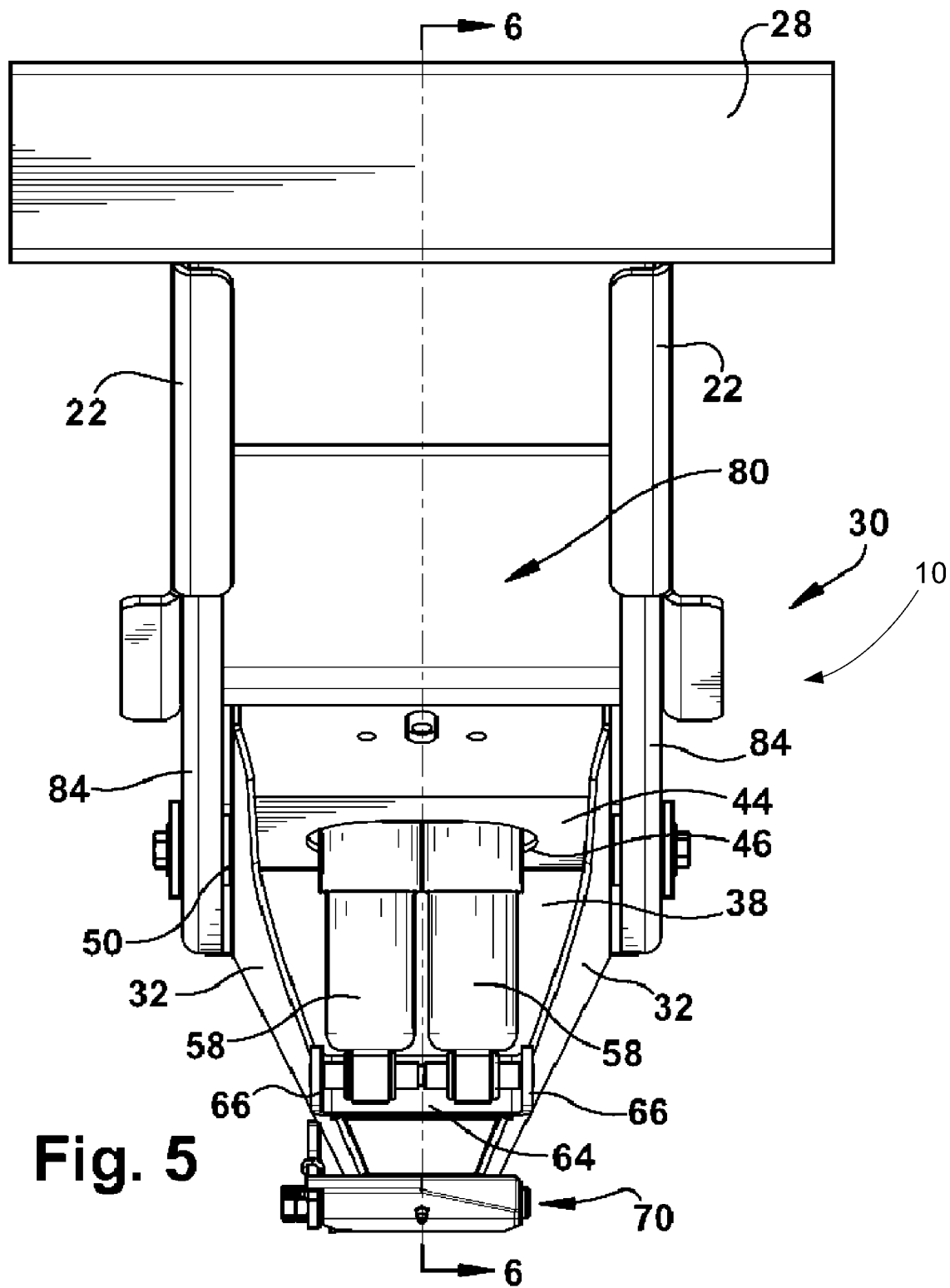
FIG. 5 is a rear view of the pin box assembly with gooseneck coupler of FIG. 4.
Figure 6:
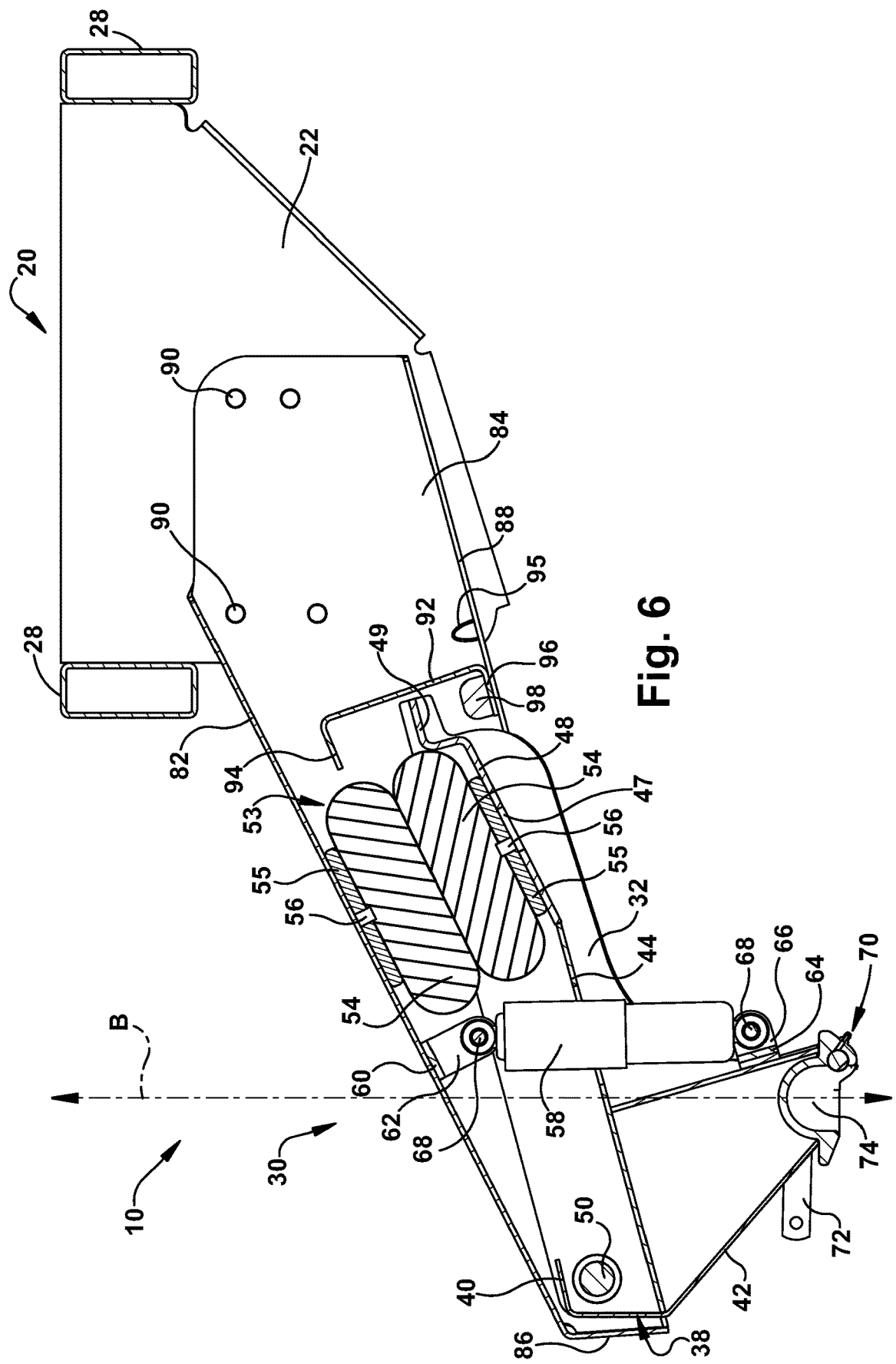
FIG. 6 is a cross-sectional side view of the pin box assembly with gooseneck coupler of FIG. 4, taken along line 6-6 of FIG. 5.
Figure 7:
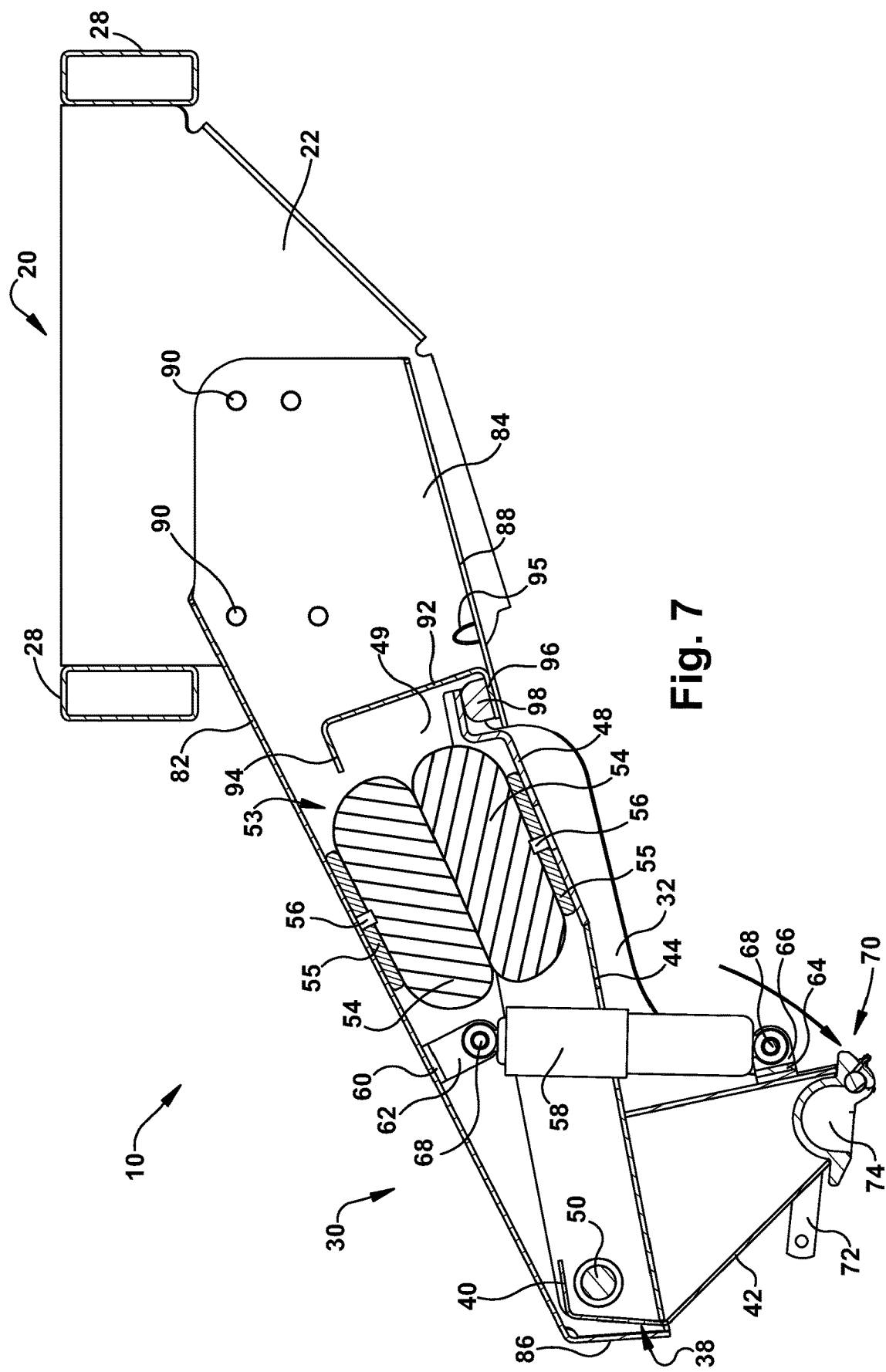
FIG. 7 is a cross-sectional side view of the pin box assembly with gooseneck coupler of FIG. 6 in a fully rotated downward position.
Figure 8:
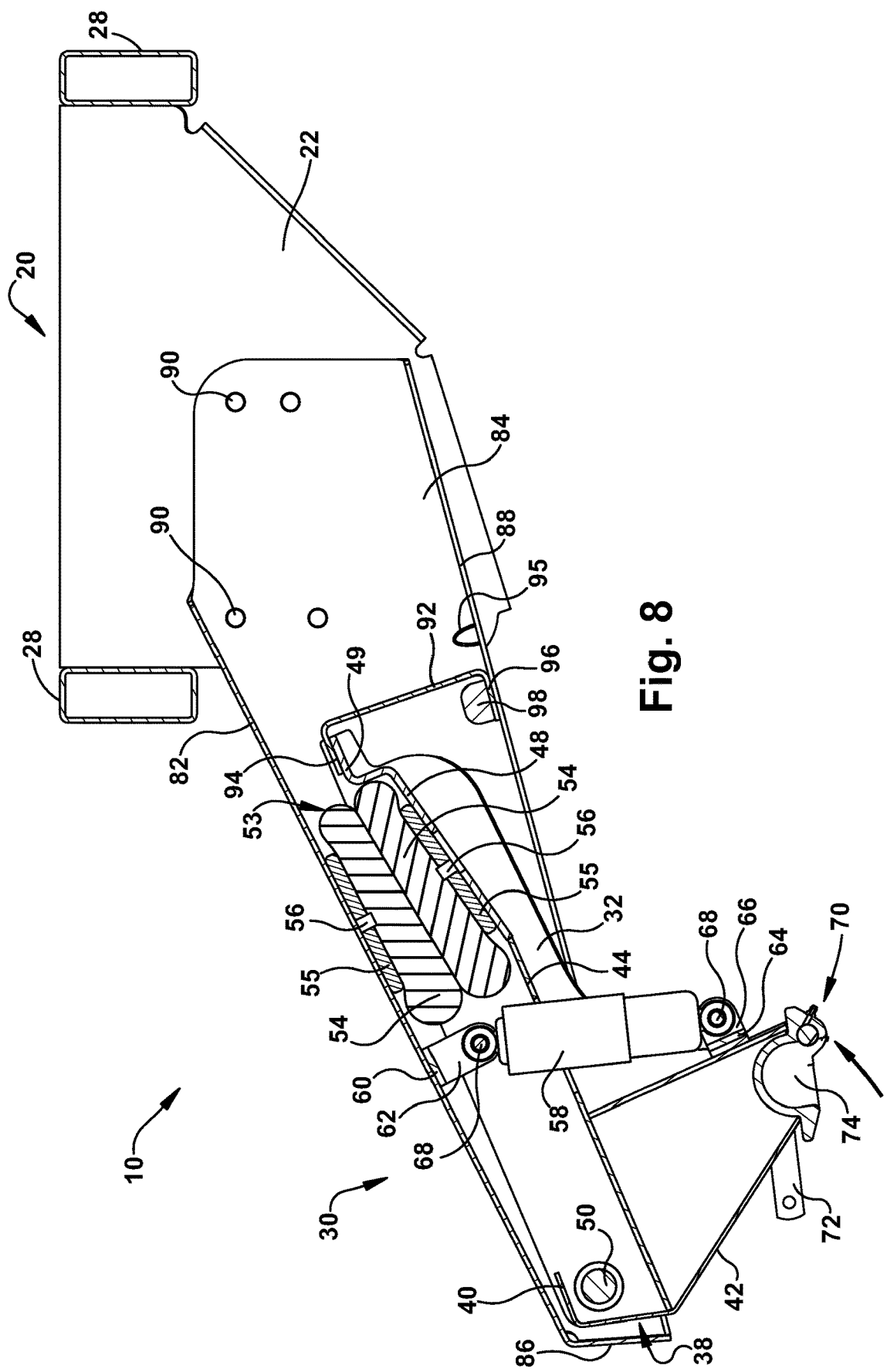
FIG. 8 is a cross-sectional side view of the pin box assembly with gooseneck coupler of FIG. 6 in a fully rotated upward position.
Figure 9:
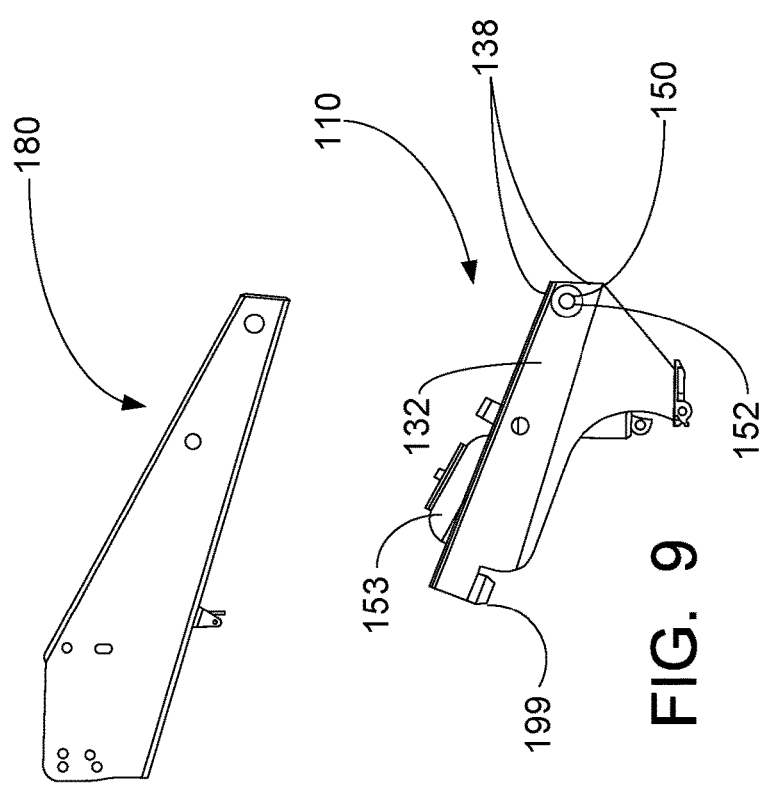
FIG. 9 is a plan view of an alternative embodiment of the pin box assembly with gooseneck coupler with a cover separated from a lower jaw assembly.
Figure 10:
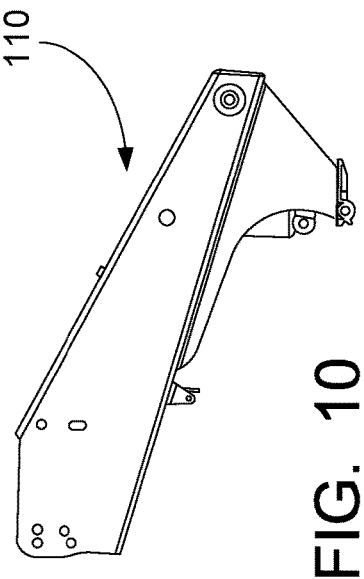
FIG. 10 is a plan view of an alternative embodiment of the pin box assembly with gooseneck coupler.

A pin box assembly with gooseneck coupler 10 is illustrated in FIGS. 1, 2, 4-8. The pin box assembly with gooseneck coupler 10 may be configured to engage a towing vehicle 12, such as a truck, and a towed vehicle 16, such as a recreational vehicle (RV), an example of which is shown in FIG. 1. The pin box assembly with gooseneck coupler 10 may be of any appropriate shape, size, type or configuration, whereby it may have an appearance of a conventional RV pin box (i.e., one used to couple the RV to a fifth wheel hitch) when compared to the look of a traditional RV pin box in use with a pin box adaptor (i.e., one used to adapt the pin box for coupling to a gooseneck ball).

In addition, the pin box assembly with gooseneck coupler 10 may be a stand alone unit with suspension and may provide for an increased range of motion. The pin box assembly with gooseneck coupler 10 may include a towed vehicle attachment assembly 20, a lower jaw assembly 30, a suspension system 51, a gooseneck ball coupler assembly 70, and a cover 80. The gooseneck ball coupler assembly 70 of the pin box assembly with gooseneck coupler 10 may engage a gooseneck ball 14 of the truck 12.

The pin box assembly with gooseneck coupler 10 may include or be utilized with a towed vehicle attachment assembly 20. The towed vehicle attachment assembly 20 may be part of or otherwise attached to the towed vehicle 16, such as coupled to the frame of towed vehicle 16, or may be part of the pin box assembly with gooseneck coupler 10. Towed vehicle attachment assembly 20, when part of or otherwise attached to the towed vehicle 16, may be the same as that utilized to couple a conventional pin box (for coupling to a fifth wheel hitch) to the frame of towed vehicle 16.

The towed vehicle attachment assembly 20 may include at least one wing 22 and at least one wing mount 28. The towed vehicle attachment assembly 20 may include any appropriate number of wings 22, such as a pair of spaced apart wings 22. Each wing 22 may be of any appropriate shape, size, type or configuration, such as of a generally planar configuration. Each wing 22 may be located at any appropriate position relative to or on the pin box assembly with gooseneck coupler 10, such as on each side of pin box assembly with gooseneck coupler 10.

Alternatively, the frame of the towed vehicle or RV 16 may include the towed vehicle attachment assembly 20 to which the pin box assembly with gooseneck coupler 10 may be secured. RVs may come equipped with such an attachment assembly 20 having wings 22 or something similar. By way of a non-limiting example, the pin box assembly with gooseneck coupler 10 may be secured or bolted up onto an existing frame of the towed vehicle or RV 16, whereby the existing frame of the towed vehicle or RV 16 may include wings 22.

In use, the pin box assembly with gooseneck coupler 10 may bolt or otherwise be attached directly to wings 22 of the towed vehicle or RV. The pin box assembly with gooseneck coupler 10 may not need any additional adaptors to be hooked directly to the gooseneck ball 14 in the towing vehicle or truck 12. In other words, pin box assembly with gooseneck coupler 10 may be coupled directly to towed vehicle attachment assembly 20, in lieu of a conventional pin box (which couples to a fifth wheel hitch), and may allow the towed vehicle 16 to be coupled to a gooseneck ball 14 in a bed of towing vehicle 12. In an attempt to overcome any extra stresses that may be put on the towed vehicle 16 from any additional reach that may be caused by the use of pin box assembly with gooseneck coupler 10 in lieu of the conventional pin box, the pin box assembly with gooseneck coupler 10 may utilize the suspension system 51. The suspension system 51, as explained below, may damp and/or absorb energy that would otherwise be transferred between towing vehicle 12 and towed vehicle 16.

Each wing 22 may include a plurality of attachment apertures 24 and a mounting flange 26. The attachment apertures 24 may be of any appropriate shape, size, type or configuration, such as of a generally circular or square shape. The attachment apertures 24 may be located at any appropriate position on the wing 22, such as being located in one or more rows or the like.

The mounting flange 26 may be of any appropriate shape, size, type or configuration, such as of a generally angular planar configuration. The mounting flange 26 may be located at any appropriate position on the wing 22, such as located towards an upper end of the wing 22. The mounting flange 26 may be utilized as a strengthening feature and a mounting feature for the wing 22.

The towed vehicle attachment assembly 20 may include any appropriate number of wing mounts 28, such as a pair of wing mounts 28. Each wing mount 28 may be of any appropriate shape, size, type or configuration, such as of a generally tubular shape. Each wing mount 28 may be located at any appropriate position on towed vehicle attachment assembly 20, such as on each end of the wings 22. By way of a non-limiting example, the wing mounts 28 may at least span the distance between the wings 22.

The gooseneck ball coupler assembly 70 may be of any appropriate shape, size, type or configuration. The gooseneck ball coupler assembly 70 may be located at any appropriate position on the pin box assembly with gooseneck coupler 10, such as located adjacent an end of the pin box assembly with gooseneck coupler 10. By way of a non-limiting example, the gooseneck ball coupler assembly 70 may be located to a generally rearward position from a generally horizontal axis A. Axis A may act as a pivot and rotational axis and may be located forward and upward from the gooseneck ball coupler assembly 70 location.

While the pin box assembly with gooseneck coupler 10 may be illustrated and described as being utilized with a gooseneck ball coupler assembly 70, it is to be understood that any appropriate type of coupler mechanism may be utilized and should not be limited to that disclosed herein. The gooseneck ball coupler assembly 70 may be secured to the pin box assembly with gooseneck coupler 10 by any appropriate means, such as with fasteners or the like.

The gooseneck ball coupler assembly 70 may include a handle 72 and a gooseneck ball receptacle 74. The handle 72 may be of any appropriate shape, size, type or configuration, such as of a generally rectangular or cylindrical shape. The handle 72 may be located at any appropriate position on the gooseneck ball coupler assembly 70, such as located to one side of the pin box assembly with gooseneck coupler 10 adjacent a side skirt 32. The gooseneck ball receptacle 74 may be of any appropriate shape, size, type or configuration, such as of a generally concave or semi-spherical shape. The gooseneck ball receptacle 74 may receive the gooseneck ball 14 from the towing vehicle 12. The handle 72 may be utilized to engage or disengage the gooseneck ball coupler assembly 70 from gooseneck ball 14 to allow gooseneck ball 14 to be inserted into or removed from gooseneck ball receptacle 74.

The lower jaw assembly 30 may be of any appropriate shape, size, type or configuration, such as of a generally rectangular box-like configuration. The lower jaw assembly 30 may be located at any appropriate position on the pin box assembly with gooseneck coupler 10, such as adjacent the cover 80. The lower jaw assembly 30 may include at least one side skirt 32, a front panel 38, a rear panel 48 and a support plate 44.

The lower jaw assembly 30 may include a pair of side skirts 32. The side skirts 32 may be of any appropriate shape, size, type or configuration, such as of a generally bent planar configuration. By way of a non-limiting example, the side skirts 32 may include a generally vertical upper portion 34 and a generally inwardly angled lower portion 36. The side skirts 32 may be located at any appropriate position on the lower jaw assembly 30, such as located on each side of the lower jaw assembly 30, whereby the upper portions 34 and the lower portions 36 may be facing one another.

The front panel 38 may be of any appropriate shape, size, type or configuration, such as of a generally bent planar configuration. By way of a non-limiting example, the front panel 38 may include a generally horizontal upper portion 40 and a generally inwardly angled lower or slanted portion 42. The front panel 38 may be located at any appropriate position on the lower jaw assembly 30, such as located at an end of the lower jaw assembly 30. By way of a non-limiting example, the front panel 38 may be located and span substantially between the pair of side skirts 32. Once assembled, the pair of side skirts 32 and the front panel 38 may come together towards a point to substantially encase and protect the gooseneck ball coupler assembly 70 substantially within the lower jaw assembly 30.

The rear panel 48 may be of any appropriate shape, size, type or configuration, such as of a generally S-shaped configuration. The rear panel 48 may include a ledge 49. The ledge 49 may be located at an end of the rear panel 48 and be generally elevated to a position away from the rear panel 48, thereby forming the general S-shape.

The rear panel 48 may also include an aperture 47. The aperture 47 may be of any appropriate shape or size, such as of a generally circular, rectangular or square shape. The aperture 47 may be located at any appropriate position on the rear panel 48, such as at the approximate center of the panel 48. The aperture 47 may provide access for an air line, hydraulic line, or the like (not shown).

The rear panel 48 may be located at any appropriate position on the lower jaw assembly 30, such as located at an opposite end of the lower jaw assembly 30 than that of the front panel 38. By way of a non-limiting example, the rear panel 48 may be located and span between the pair of side skirts 32. The side skirts 32, front panel 38 and rear panel 48 may be secured to one another by any appropriate means, such as by welding, fasteners or the like.

The support plate 44 may be of any appropriate shape, size, type or configuration, such as of a generally planar configuration. The support plate 44 may be located at any appropriate position on the lower jaw assembly 30, such as located within the front panel 38, side skirts 32 and rear panel 48. The support plate 44 may be secured to the side skirts 32, front panel 38 and rear panel 48 by any appropriate means, such as by welding, fasteners or the like. The support plate 44 may include an opening 46. The opening 46 may be of any appropriate shape or size, such as of a generally circular, oval or rectangular shape. The opening 46 may be located at any appropriate position on the support plate 44, such as adjacent an end of the support plate towards the rear panel 48.

The pin box assembly with gooseneck coupler 10 may include a pivot shaft 50. The pivot shaft 50 may be of any appropriate shape, size, type or configuration, such as of a generally cylindrical configuration. The pivot shaft 50 may be located at any appropriate position on the pin box assembly with gooseneck coupler 10, such as adjacent the front panel 38 of the lower jaw assembly 30. By way of a non-limiting example, the pivot shaft 50 may be located through apertures (not shown) within the upper portions 34 of each side skirt 32. The pivot shaft 50 may be secured to the lower jaw assembly 30 by any appropriate means, such as with any appropriate type or number of fasteners 52. Axis A may be located along the pivot shaft 50. Pivot shaft 50 may be located forward of the vertical center line B and vertically upward of gooseneck ball receptacle 74. This location of pivot shaft 50 may aide in the movement of pin box assembly with gooseneck coupler 10 relative to gooseneck ball 14 and may aide in the reduction of energy transfer between towing vehicle 12 and towed vehicle 16.

The pin box assembly with gooseneck coupler 10 may include a suspension system 51, such as an air ride suspension system 51. The air ride suspension system 51 may include an air bag 53 and at least one shock absorber 58. The air ride suspension 53, 58 may absorb shock loads in the vertical or up/down, longitudinal or fore/aft, and rotational directions by utilizing the shock absorbers 58 and the air bag 53. This may provide for reduced stress on the towed vehicle 16 from the air ride suspension 53, 58.

The air bag 53 may be of any appropriate shape, size, type or configuration, such as a double convoluted air bag 53. The air bag 53 may be located at any appropriate position on the lower jaw assembly 30, such as located on the rear panel 48 and adjacent the opening 46 in the support plate 44. The double convoluted air bag 53 may include a remote air fill line (not shown), whereby the air bag 53 pressure may be tuned for the individual towed vehicle 16 on which it is used. This may be done by increasing or decreasing the air pressure. The nominal operating pressure may be set by adjusting the air pressure until alignment of a lower jaw line C and a cover line D is realized. The double convoluted air bag 53 may also provide for a better spring rate and a longer stroke.

The air bag 53 may include a pair of air bellows 54. The air bellows 54 may be of any appropriate shape, size, type or configuration, such as of a generally spherical shape. The air bellows 54 may be located at any appropriate position in relation to one another, such as being located one on top of the other. The air bag 53 may be utilized to help improve the overall ride of the towed vehicle 16, help increase towed vehicle 16 stability, help keep the towed vehicle 16 level, level off-center loads, reduce bottoming out, and/or reduce suspension fatigue.

The air bag 53 may be secured to the pin box assembly with gooseneck coupler 10 by any appropriate means, such as by utilizing mounting plates 55. The mounting plates 55 may be of any appropriate shape or size, such as a generally planar circular, rectangular or square shape. There may be one mounting plate 55 located on each side of the air bag 53. The mounting plates 55 may be located at any appropriate position on the air bag 53, whereby one mounting plate 55 may be located on the outer portion of each bellow 54. The mounting plates 55 may be secured to each bellow 54 by any appropriate means.

The mounting plates 55 may be secured to the pin box assembly with gooseneck coupler 10 by utilizing any appropriate number or type of mounting members or fasteners 56. By way of a non-limiting example, the air bag 53 may be secured on its upper end to a top wall 82 of the cover 80 via the upper mounting plate 55 and fasteners 56 and the air bag 53 may be secured on its lower end to the rear panel 48 via the lower mounting plate 55 and fasteners 56.

The pin box assembly with gooseneck coupler 10 may include any appropriate number of shock absorbers 58. By way of a non-limiting example, the pin box assembly with gooseneck coupler 10 may include a pair of shock absorbers 58. The shock absorbers 58 may be of any appropriate shape, size, type or configuration. The shock absorbers 58 may be located at any appropriate position on the pin box assembly with gooseneck coupler 10, such as located being located through the opening 46 of the support plate 44. Shock absorbers 58 may be located in front or forward of airbag 53 and rear or rearward of pivot pin 50. Shock absorbers 58 may be located rear or rearward of gooseneck ball coupler assembly 70.

The shock absorbers 58 may be secured to the pin box assembly with gooseneck coupler 10 by any appropriate means. By way of a non-limiting example, the pin box assembly with gooseneck coupler 10 may include an upper attachment plate 60, a lower attachment plate 64, and at least one fastener or pin 68. The upper attachment plate 60 may be of any appropriate shape, size, type or configuration, such as of a generally C-shaped configuration. By way of a non-limiting example, the upper attachment plate 60 may include a pair of upper ears 62 located on each end of the upper attachment plate 60, whereby each ear 62 is generally perpendicular to the upper attachment plate 60.

The upper attachment plate 60 may be located at any appropriate position on the pin box assembly with gooseneck coupler 10, such as located on the top wall 82 of the cover 80. The upper attachment plate 60 may be secured to the cover 80 by any appropriate means, such as by fasteners, welding or the like.

The lower attachment plate 64 may be of any appropriate shape, size, type or configuration, such as of a generally C-shaped configuration, which may be similar to that of the upper attachment plate 60. By way of a non-limiting example, the lower attachment plate 64 may include a pair of lower ears 66 located on each end of the lower attachment plate 64, whereby each ear 66 is generally perpendicular to the lower attachment plate 64.

The lower attachment plate 64 may be located at any appropriate position on the pin box assembly with gooseneck coupler 10, such as located adjacent the lower portions 36 of the side skirts 32. The lower attachment plate 64 may be secured to the side skirts 32 by any appropriate means, such as by fasteners, welding or the like. A first end of the shock absorbers 58 may be secured to the upper attachment plate 60 and the opposite end of the shock absorbers 58 may be secured to the lower attachment plate 64, whereby the shock absorbers 58 may extend between the upper and lower attachment plate 60, 64. The shock absorbers 58 may be secured to the attachment plates 60, 64 by any appropriate means, such as with fasteners or pins 68.

The cover 80 may be of any appropriate shape, size, type or configuration. The cover 80 may be located at any appropriate position on the pin box assembly with gooseneck coupler 10, such as located adjacent to and above the lower jaw assembly 30. The cover 80 may include a top wall 82, at least one side wall 84, a front wall 86 and a bottom wall 88. These walls 82, 84, 86, 88 may be integrally formed as one component or may be individual components that may be assembled together by any appropriate means, such as by welding, fasteners, or the like.

The side walls 84 may extend generally perpendicularly downwardly from the top wall 82, whereby the side walls 84 may be located adjacent or abut the upper portion 34 of the side skirts 32. The front wall 86 may also extend generally perpendicularly downwardly from the top wall 82, whereby the front wall 86 may be located adjacent or abut a portion of the front panel 38. In this manner, the front wall 82, side walls 84 and front wall 86 may generally form a triangular box.

The cover 80 may also include at least one attachment aperture 90. By way of a non-limiting example, the cover 80 may include any appropriate number or apertures 90, such as four apertures 90 located on each side wall 84. The attachment apertures 90 may be of any appropriate shape or size, such as a generally circular or square shape. By way of a non-limiting example, the attachment apertures 90 may be of a similar shape and size as the attachment apertures 24 of the wings 22, whereby the cover 80 and the wings 22 may be secured to one another by aligning the attachment apertures 24, 90 and securing a fastener (not shown) therethrough.

The pin box assembly with gooseneck coupler 10 may include a back plate 92. The back plate 92 may be of any appropriate shape, size, type or configuration, such as of a generally C-shaped configuration. By way of a non-limiting example, the back plate 92 may include a first flap 94 and a second flap 96 to form the general C-shape. The first flap 94 and the second flap 96 may be located opposite one another. The back plate 92 may be located at any appropriate position on the pin box assembly with gooseneck coupler 10, such as located on the bottom wall 88 of the cover 80. The back plate 92 may be secured to the bottom wall 88 by any appropriate means, such as by welding, fasteners, or the like.

The pin box assembly with gooseneck coupler 10 may also include at least one damping block 98. The damping block 98 may be of any appropriate shape, size, type or configuration, such as a generally square or rectangular shape. The damping block 98 may be fabricated out of any appropriate type of materials, such as rubber or an elastomeric material. The damping block 98 may provide for extreme rotation damping.

The damping block 98 may be located at any appropriate position on the pin box assembly with gooseneck coupler 10. By way of a non-limiting example, the damping block 98 may be secured to the second flap 96 of the back plate 92. Alternatively, the damping block 98 may be secured to a lower side of the ledge 49. The damping block 98 may be secured to the pin box assembly with gooseneck coupler 10 by any appropriate means, such as with fasteners or the like. In either position, the damping block 98 may provide for a hard stop between the ledge 49 of the rear support skirt 48 and the second flap 96 of the back plate 92. Damping block 98 may thereby serve to limit rotation about axis A.

In use, the function of the pin box assembly with gooseneck coupler 10 may be possible by allowing the gooseneck ball coupler assembly 70 to move. The gooseneck ball coupler assembly 70 may be able to rotate around axis A via front pivot shaft 50. This rotation allows the gooseneck ball coupler assembly 70 to move up and down as well as fore and aft. This movement may be absorbed by the double convoluted air bag 53 and damped by the dual shock absorbers 58.

The forward and upward location of axis A may allow for damping the vertical relative motion and the longitudinal or fore/aft relative motion. By way of a non-limiting example, axis A may be located forward of the gooseneck ball coupler assembly 70 location, whereby the suspension system 51 of the pin box assembly with gooseneck coupler 10 may damp vertical motion of the gooseneck ball coupler assembly 70 relative to the cover 80 about axis A. Axis A may also be located upward of the gooseneck ball coupler assembly 70 location, whereby the suspension system 51 of the pin box assembly with gooseneck coupler 10 may damp longitudinal motion of the gooseneck ball coupler assembly 70 relative to the cover 80 about axis A.

In a non-limiting example, the axis of rotation A may be located approximately 3-10 inches forward from a centerline of the gooseneck ball coupler assembly 70 and approximately 3-12 inches upward from a centerline of the gooseneck ball coupler assembly 70. More specifically, the axis of rotation A may be located approximately 6-8 inches forward from the centerline of the gooseneck ball coupler assembly 70 and approximately 6-8 inches upward from the centerline of the gooseneck ball coupler assembly 70.

The rotation about axis A may have a range of approximately 8 degrees upward and approximately 6 degrees downward from a nominal level position. The upward rotation limit may be controlled by the maximum compression of the air bag 53 and/or a hard stop. This upward hard stop, which may be metal-to-metal, may occur when the ledge 49 and the upper flap 94 come into contact. The downward rotation limit may utilize the damping block 98 to diminish a hard stop in the downward direction.

This range of motion may allow the gooseneck ball coupler assembly 70 to move in relation to the wings 22 of towed vehicle attachment assembly 20 and through air bag 53 and shock absorbers 58 the pin box assembly with gooseneck coupler 10 may absorb and damp energy from the road and hazards and reduce the energy transferred to the towed vehicle 16. The reduction in energy transfer to towed vehicle 16 may reduce the wear and tear on towed vehicle 16 and may allow for towed vehicles that are relatively more fragile to be coupled to a gooseneck ball 14 in a bed of a towing vehicle 12 in lieu of using a fifth wheel hitch. This ability may allow a towing vehicle having a gooseneck ball 14 in the bed thereof to tow a larger variety of towed vehicles.

Use of the pin box assembly with gooseneck coupler 10 may be aided by a pull cable (not shown) for disconnecting the gooseneck ball coupler assembly 70, an air line (not shown) for inflation and tuning of the air bag 53, and safety chains (not shown). The pin box assembly with gooseneck coupler 10 may also include at least one hook 95. By way of a non-limiting example, any appropriate number of hooks 95 may be utilized, such as a pair of hooks 95. The hooks 95 may be utilized in conjunction with the safety chains. The hooks 95 may be located at any appropriate position on the pin box assembly with gooseneck coupler 10, such as on each side of the bottom wall 88 of the cover 80. By way of a non-limiting example, each hook 95 may be located adjacent to each side wall 84 of the cover 80 and adjacent to the back plate 92.

The pin box assembly with gooseneck coupler 10 according to the present teachings may thereby facilitate the use of a bed mounted gooseneck ball to tow a greater variety of towed vehicles. Pin box assembly with gooseneck coupler 10 may be mounted to a towed vehicle utilizing the same mounting features as the conventional pin box that is designed to be coupled to a fifth wheel hitch. This universal mounting arrangement may allow for easy conversion or retrofitting of existing fifth wheel coupling towed vehicles to use with a bed mounted gooseneck ball. The energy absorbing capability of the pin box assembly with gooseneck coupler 10 may allow for relatively more fragile towed vehicles to be coupled to a gooseneck ball for transport.

Additional embodiments of a pin box assembly with gooseneck coupler 10 according the present teachings are described below. In the descriptions, all of the details and components may not be fully described or shown. Rather, the main features or components are described and, in some instances, differences with the above-described embodiment may be pointed out. Moreover, it should be appreciated that these additional embodiments may include elements or components utilized in the above-described embodiment although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired pin box assembly with gooseneck coupler without departing from the spirit and scope of the present invention.

In some embodiments, an example of which is shown in FIGS. 9-12, a pin box assembly with gooseneck coupler 110 may include a lower jaw assembly 130 containing a pair of side skirts 132. The pin box assembly with gooseneck coupler 110 may further include a cover 180, a gooseneck coupler assembly 170, a shock absorber 158 (although two are shown, the present teachings are not limited to two, any number of shock absorbers 158 may be used), a pivot shaft 150 with a fastener 152, and an air bag 153, all of which function similar to the same elements in the other embodiments disclosed herein.

The lower jaw assembly 130 of the present embodiment may have a taller profile than the other embodiments. In particular, the jaw assembly 130 may include a front panel 138 that may be located in proximity to the pivot shaft 150 and the fastener 152. The front panel 138 in this embodiment may have a taller profile than the other embodiments disclosed herein.

Figure 12:
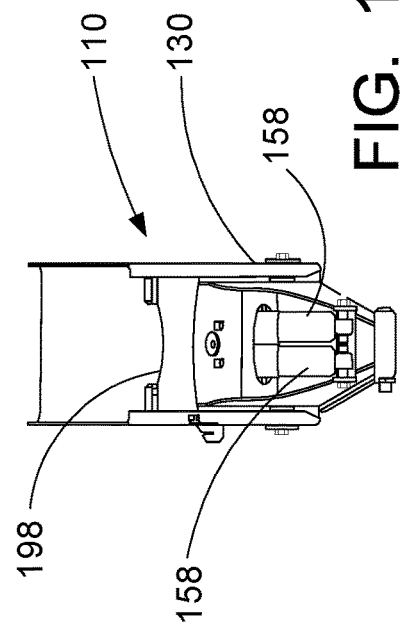
FIG. 12 is a rear view an alternative embodiment of the pin box assembly with gooseneck coupler of FIG. 10.

Additionally, the cover 180 may include an additional reinforcement portion 198 as shown in FIG. 12, which may provide added structure to the overall pin box assembly with gooseneck coupler 110. This rigidity may make the pin box assembly with gooseneck coupler 110 and in particular the cover 180 stiffer and less resistance to bending forces.

Figure 11:
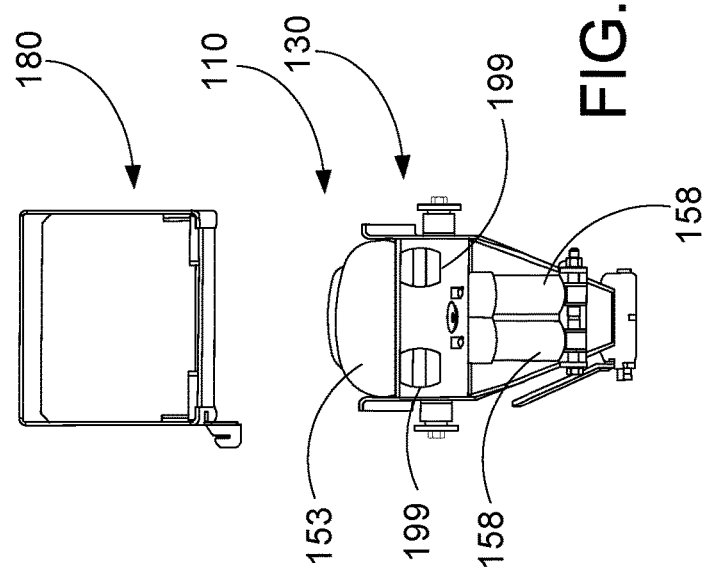
FIG. 11 is a rear view an alternative embodiment of the pin box assembly with gooseneck coupler of FIG. 10 with the cover separated from the lower jaw assembly.

The lower jaw assembly 130 may include a pair of bump stop isolators 199. Although a pair of bump stop isolators 199 is shown, it should be understood that any number of bump stop isolators 199 may be used. The bump stop isolators 199 may attach opposite the air bag 153 on the lower jaw assembly 130 as shown in FIG. 11. The bump stop isolators 199 may provide suspension to the pin box assembly with gooseneck coupler 110 in a direction generally opposite to that of the air bag 153. When the air bag 153 contracts then expands the bump stop isolators 199 may create a cushioning effect to further smooth the ride of the towing and towed vehicle 12, 16 through the pin box assembly with gooseneck coupler 110. In the some embodiments, the bump stop isolators 199 may be hollow rubber pieces, such as by way of a non-limiting example a rubber hollow spring. Although, the bump stop isolators 199 are not limited to such and may comprise any appropriate material, and be of any appropriate size.

In some embodiments, such as shown in FIGS. 13-14, a pin box assembly with gooseneck coupler 210 may include an automatic air pressure adjustment assembly, such as by way of a non-limiting example, an air relief system 235 shown in FIGS. 13-14. The air relief system 235 may be operatively secured with the suspension system 251, and more specifically, it may be operatively secured to the air bag 253. The air relief system 235 may also be secured to the pin box assembly with gooseneck coupler 210 in any appropriate position and manner. By way of a non-limiting example, the pin box assembly with gooseneck coupler 210 may include a bracket 237 that may be attached to the cover 280, and more specifically, may be attached to the sidewall 284 of the cover 280 as shown in FIG. 13. The air relief system 235 may be attached to the bracket 237 such that a user may access at least a portion of the air relief system 235.

The air relief system 235 may be capable of automatically adjusting the air pressure present in the air bag 253 in order to relieve the air bag 253 of air when the air pressure of the air bag 253 exceeds a predetermined amount. By way of a non-limiting example, if the user overfills the air bag 253 such that it exceeds a predetermined amount of air pressure, the air relief system 235 may automatically relieve the air bag 253 of an appropriate amount of air pressure during use and operation of the pin box assembly with gooseneck coupler 210, without the need for a user to intervene.

The air relief system 235 may include an air line 261 having an air valve 263 attached at an end thereof, the air valve 263 capable of being operatively coupled with an air source (not shown). The air valve 263 may be attached to the bracket 237 such that a user can access the air valve 263 without the need for opening any portion of the pin box assembly with gooseneck coupler 210.

The air relief system 235 may further include an automatic air adjustment member 265. The automatic adjustment member 265 may include an air relief valve 267, such as by way of a non-limiting example, a pop-off valve. The air relief valve 267 may operate such that when the air pressure in the air bag 253 and/or the air relief system 235 exceeds a predetermine amount, the air relief valve 267 opens and air is released from the air bag 253 and/or the air relief system 235, as applicable. Once a predetermined amount of air is released, the air relief valve 267 may close; this all may occur without user intervention. The opening and releasing of the air from the air relief system 235 may be repeated until the air bag 253 contains the appropriate amount of air pressure.

In an exemplary embodiment, the air relief system 235 may further include a brass reducer 269 that may be attached to a brass T-shaped body 271. This may assist with securing the air relief system 235 with the pin box assembly with gooseneck coupler 210. The air relief system 235 may further include a threaded member 237 that may be operatively secured to the air bag 253 in any appropriate manner such that air may enter and exit the air bag 253 through the threaded member 237. The air relief system 235, however, is not limited to this construction and may be of any appropriate construction.

In operation, the air relief system 235 may automatically remove air from the air bag 253 when the air pressure in the air bag 253 exceeds a predetermined amount. When the air pressure in either of the air relief system 235 and the air bag 253, the pop-off valve 267 will release a predetermine amount of air. This may occur at the moment of a user filling the air bag 253 or may occur during operation of the pin box assembly with gooseneck coupler 210.

By way of a non-limiting example, a user over-filling the air bag 253 may result in the pop-off valve 267 releasing a predetermine amount of air due to the air pressure in the air bag 253 exceeding a predetermined amount. Additionally, during operation of the pin box assembly with gooseneck coupler 210, the pop-off valve 267 may release a predetermine amount of air when the air pressure at the pop-off valve 267 exceeds the predetermined amount. When the gooseneck coupler assembly 270 pivots along pivot axis A relative the wings 222 of the towed vehicle attachment assembly 220, the air bag 253 and shock absorbers 258 may absorb and damp energy from the road and hazards and reduce the energy transferred to the towed vehicle. This may result in the upward rotation limit of the gooseneck coupler assembly 270, or more specifically the rotation of the lower jaw assembly 230, being controlled by the maximum compression of the air bag 253. The air bag 253, therefore, may be compressed against the cover 280 during this pivoting of the lower jaw assembly 230. If the air pressure in the air bag 253 exceeds a predetermined amount, as the air bag 253 is compressed against the cover 280, the pressure will further rise in the air bag 253, which may result in the air pressure exceeding the limits of the pop-off valve 267 such that the pop-off valve releases an appropriate amount of air. This process may be repeated as the air bag 253 compresses against the cover 280 until the air pressure in the air bag 253 reaches an appropriate amount.

In an exemplary embodiment, the operating ranges of the air bag 253 may be between approximately 35-50 psi. If the air bag 253 is filled to 60 psi, as the air bag 253 compresses against the cover during operation, the pressure in the air bag 253 may increase to 80 psi. In this exemplary embodiment, the pop-off valve 267 may have a predetermined air release pressure of 70 psi. The pop-off valve 267 may, therefore, release the air in the air bag 253 until it reaches a pressure of 70 psi releasing approximately 10 psi of air from the air bag 253 until it closes. The uncompressed air pressure of the air bag may then result in being 50 psi, which is in the predetermined operating range. This, therefore, may result in the air pressure of the air bag 253 being automatically adjusted to the appropriate operating range.

In some embodiments, the pin box assembly with gooseneck coupler 210 may include an indicator 291 that may alert a user when the air bag 253 is under-inflated. In some embodiments, the indicator 291 may include a pair of tell-tale pins attached at any appropriate position on the lower jaw assembly 230. The lower jaw assembly 230 may include a ledge 293 that may be attached to the side skirt 232. The tell-tale pins 291 may be attached to the ledge 293 of the side skirt 232. In the alternative, the tell-tale pins 291 may be attached to the ledge 249 of the lower jaw assembly 230.

The tell-tale pins 291 may be attached in any appropriate manner. By way of a non-limiting example, the tell-tale pins 291 may include a threaded bolt that may be attached using a nut, by welding, or by using a nut and welding.

In operation, when the air bag 253 is under-inflated and the lower jaw assembly 230 pivots upwards toward the cover 280, the tell-tale pins 291 may contact the cover 280. The user may identify the noise of the tell-tale pins 291 contacting the cover 280 or the user may remove the cover 280 and observe the tell-tell pins 291 to determine if they have contacted the cover 280, which would indicate that the air bag 253 does not possess enough air. The user may then fill the air bag 253 to the appropriate air pressure. By way of a non-limiting example, if the air bag 253 is under-inflated for an extended period of time, the tell-tale pins 291 may be designed to become damaged or even break to alert the user of the under-inflated air bag 253.

In some embodiments, the pin box assembly with gooseneck coupler 210 may include a pair of bump stop isolators 299, which may attach opposite the air bag 253 on the lower jaw assembly 230. The bump stop isolators 299 may provide suspension to the pin box assembly with gooseneck coupler 210 in a direction generally opposite to that of the air bag 253. When the air bag 253 contracts then expands the bump stop isolators 299 may create a cushioning effect to further smooth the ride of the towing and towed vehicle 12, 16 through the pin box assembly with gooseneck coupler 210.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof. By way of non-limiting example, air bag 53 may be supplemented and/or replaced by another type of spring or biasing arrangement although all of the present advantages may not be realized.

Having thus described the invention, the following is claimed:

1. A towing assembly comprising:
   a first member capable of being secured to a towed vehicle;

a second member pivotally coupled to said first member about an axis of rotation wherein said second member pivots relative to said first member about said axis of rotation;

a gooseneck ball coupler having a socket configured to engage a ball, the gooseneck ball coupler coupled to said second member, wherein said axis of rotation is located forwardly and upwardly from said gooseneck ball coupler; and a suspension system coupled to at least one of said first and second members, said suspension system damping motion between said first and second members, wherein said suspension system includes a biasing member positioned entirely rearward of said gooseneck ball coupler.

2. The towing assembly of claim 1 further comprising a pin member coupling said first and second members together, said pin member defining said axis of rotation.

3. The towing assembly of claim 1, wherein said second member moves in a plurality of directions relative to said first member via said axis of rotation.

4. The towing assembly of claim 1, wherein said second member is rotatable upwardly about said axis of rotation and downwardly about said axis of rotation.

5. The towing assembly of claim 1, wherein said suspension system includes at least one shock absorber.

6. The towing assembly of claim 5, wherein said at least one shock absorber is rearward of said axis of rotation and said gooseneck ball coupler.

7. The towing assembly of claim 5, wherein said at least one shock absorber is located rearward of said gooseneck ball coupler and forward of said biasing member such that said biasing member is rearward of said at least one shock absorber.

8. The towing assembly of claim 1, wherein said biasing member is an air bag.

9. The towing assembly of claim 1, wherein said suspension system damps longitudinal motion and vertical motion of said second member relative to said first member.

10. The towing assembly of claim 1 further comprising an upper hard stop and a lower hard stop limiting motion of said second member relative to said first member.

11. The towing assembly of claim 10 further comprising a damping block located on said lower hard stop.

12. The towing assembly of claim 11 further comprising a ledge coupled to said second member that engages with said damping block when said second member is rotated fully downwardly.

13. A towing assembly for coupling a towed vehicle to a towing vehicle, said towing assembly comprising:
a first member configured to be attached to said towed vehicle in a fixed orientation;
a second member coupled to said first member about an axis of rotation wherein said second member pivots relative to said first member about said axis of rotation;
a suspension system coupled to at least one of said first and second members, said suspension system including a biasing member capable of restricting relative movement between said first and second members, said suspension system positioned rearward of said axis of rotation; and
a gooseneck ball coupler attached to said second member and capable of moving upon movement of said second member, said gooseneck ball coupler configured to engage and disengage with a ball portion of a gooseneck ball on said towing vehicle.

14. The towing assembly of claim 13, wherein said axis of rotation is located forwardly and upwardly from said gooseneck ball coupler.

15. The towing assembly of claim 13, wherein said suspension system comprises a damping member, said suspension system damps longitudinal motion of said second member relative to said first member and damps vertical motion of said second member relative to said first member.

16. A towing assembly comprising:
a first box member capable of selectively attaching to a towed vehicle;
a second box member pivotally secured to said first box member about an axis of rotation;
a gooseneck ball coupler coupled to said second box member, said gooseneck ball coupler configured to engage a ball portion of a gooseneck ball;
a biasing member coupled to said second box member, said biasing member restricting relative motion between said first and second box members; and
a bump stop isolator attached to only said second box member opposite said biasing member, said bump stop isolator providing suspension to said second box member in a direction generally opposite to that of said biasing member.

17. A towing assembly comprising:
a towed vehicle attachment assembly configured to be attached to a towed vehicle in a fixed orientation;
a lower jaw assembly pivotally coupled to said towed vehicle attachment assembly;
a suspension system coupled to at least one of said towed vehicle attachment assembly and said lower jaw assembly, said suspension system including a pneumatic member capable of restricting relative movement between said towed vehicle attachment assembly and said lower jaw assembly;
an automatically adjusting air relief system operatively secured with said suspension system, wherein said air relief system automatically adjusts said pneumatic member from being over inflated to maintain said pneumatic member in an operative state; and
a gooseneck ball coupler attached to said lower jaw assembly and capable of moving upon movement of said lower jaw assembly, said gooseneck ball coupler configured to engage and disengage with a ball portion of a gooseneck ball on said towing vehicle, wherein said pneumatic member is positioned entirely rearward of said gooseneck ball coupler.

18. The towing assembly of claim 17 wherein said pneumatic member comprises an air bag.

19. The towing assembly of claim 18, wherein the air relief system includes an air relief valve wherein said air relief valve adjusts automatically said air bag from being over-inflated.

20. The towing assembly of claim 19, wherein said air relief valve automatically adjusts the air pressure of said air bag upon said air bag restricting relative movement between said towed vehicle attachment assembly and said lower jaw assembly.

21. The towing assembly of claim 17 further comprising an indicator configured to alert the user when the said air relief system is under-inflated.

* * * * *